United States Patent [19]
Jones

[11] 4,099,214
[45] Jul. 4, 1978

[54] ELECTRONICALLY CONTROLLED BRAKING MEANS FOR A DOCUMENT HANDLING MACHINE

[75] Inventor: Alan P. Jones, Levittown, Pa.

[73] Assignee: Brandt-Pra, Inc., Cornwells Heights, Pa.

[21] Appl. No.: 743,778

[22] Filed: Nov. 22, 1976

Related U.S. Application Data

[62] Division of Ser. No. 613,633, Sep. 15, 1975, Pat. No. 4,015,110.

[51] Int. Cl.$^2$ .................. H02H 7/085
[52] U.S. Cl. .................. 361/31; 318/476; 355/14; 361/94
[58] Field of Search .................. 361/31, 23, 28, 30, 361/98, 93, 94; 355/14; 235/92 SB; 318/474, 476, DIG. 1, 366, 213, 211, 212, 209, 269, 273, 278, 434, 430, 432, 433; 360/74

[56] References Cited

U.S. PATENT DOCUMENTS

| | | | |
|---|---|---|---|
| 3,440,511 | 4/1969 | Igarashi et al. | 318/269 |
| 3,477,007 | 11/1969 | Ducommun et al. | 318/434 |
| 3,513,374 | 5/1970 | Koment | 318/476 X |
| 3,564,337 | 2/1971 | MacGeorge | 361/31 X |
| 3,813,157 | 5/1974 | Fantozzi | 235/92 SB X |

*Primary Examiner*—Patrick R. Salce
*Attorney, Agent, or Firm*—Louis Weinstein

[57] ABSTRACT

Electronic control means for a paper handling and counting machine. An LED array provides a visual display of the number of paper documents counted during either normal counting or "batching" operations. The LED display is utilized to the exclusion of additional display devices for providing an indication of a jam condition in the event of a jam by "flashing" the zero decimal digit. A similar indication is artificially created upon turn-on of the machine. When operating in the "batching" mode the LED array, in addition to providing a visual display of a completed batch count, will display a partially completed batch count in a flashing manner. The "jam-type" display is also activated whenever the batch control selector switch is switched from the "count" mode position to any batching mode position. Means are also provided to abruptly stop the drive source for the machine upon the occurrence of a jam condition and also to abruptly stop the drive source for the machine upon the completion of a batch, said abrupt stoppage being accomplished by dynamic braking means. A "leading zero" detection circuit blanks unnecessary zeros from being illuminated.

The load upon the motor is continuously monitored and, in the event that the current drawn by the motor increases above a predetermined threshold, a jam condition is created to dynamically brake the motor in order to protect the machine from being damaged due to a jam and to further protect the operator from injury.

7 Claims, 2 Drawing Figures

19
1234
17c-3
17c-4
17c-5
17c-2
17c-1
17c-6
17c-7
18
DECODER
17
17b
$10^3$
$10^2$
$10^1$
$10^0$
RESET
VDD
VDD
VDD
R8
BLANK
DRIVER
CIRCUIT
20
R11
R12
R13
R14
15d-1
15d-2
15d-3
15d-4
15c-1
15c-2
15c-3
15c-4
5-DIGIT
DECADE
COUNTER
15
15b
15a
15e
16
$V_D$
COUNT
TO FIG 1b
RESET
R15
12e
12b
12
R4
$D_2$
C3
C4
R60
$CP_2$
31
32
DOC END
DOC LATCH
JAM HOLD
VDD
R65
11
P
PHOTO-
TRANSISTOR
DOCUMENTS
$V_D$
$R_2$
G
$D_2$
LIGHT
SOURCE
L
$D_1$
PATH OF
MOVEMENT
OF DOCUMENTS
$S_1$ POWER/IN
SOURCE
POWER
SUPPLY
TO CIRCUITS
$I_1$
VAC

ELECTRONICALLY CONTROLLED BRAKING MEANS FOR A DOCUMENT HANDLING MACHINE

This is a division of application Ser. No. 613,633, filed Sept. 15, 1975, now U.S. Pat. No. 4,015,110 issued Mar. 29, 1977.

BACKGROUND OF THE INVENTION

The present invention relates to paper handling and counting machines and more particularly to novel electronic means for controlling the machine and for visually displaying accumulated counts developed by the machine, as well as other machine conditions wherein the count display means is also utilized to provide an indication of the possible operating states of the machine.

There are a wide variety of applications in which it is extremely advantageous to provide equipment for counting paper documents accurately and at high speed. Some typical applications exist in the fields of counting checks, paper currency and tickets, to name just a few. Especially when counting paper currency, it is important that the paper handling and counting equipment be capable of providing an accurate error-free count. One suitable machine for accomplishing these objectives is disclosed in U.S. Pat. No. 3,771,783 issued Nov. 13, 1973 and assigned to the assignee of the present application. The electronic control means for controlling a paper handling and counting device of the type described in the above-mentioned patent is disclosed in U.S. Pat. No. 3,870,868 issued Mar. 11, 1975, which patent is also assigned to the assignee of the present invention. Although the above paper counting and handling machine and electronic control equipment has been found to be quite satisfactory for achieving the above objectives, it is nevertheless desirable to provide a machine of similar capabilities at a significantly reduced cost. Such an inexpensive and yet highly reliable and accurate machine is described in copending application Ser. No. 618,280 filed Sept. 30, 1975 by the assignee of the present invention. Commensurate with the objective of providing an inexpensive paper counting and handling machine, it is an objective of the present invention to provide an inexpensive and yet highly reliable and accurate electronic control means adapted to control the paper counting and handling apparatus described in the above-mentioned copending patent application.

The paper counting and handling apparatus described in the above-mentioned U.S. Pat. No. 3,771,783 and utilizing the control and display means described in U.S. Pat. No. 3,870,868, includes a display means for displaying a cumulative count of the documents already counted and provides further display means or lamps for indicating other pertinent operating states of the apparatus such as the occurrence of a jam condition, the occurrence of a power-on state, a visual indication of the fact that the machine is in the batch mode, and the like.

One objective of the present invention is to provide all of the above visual indications and displays through the utilization of the count display means to the exclusion of all other separate lamps or display devices, thereby significantly simplifying the electronic control means, reducing the cost thereof and increasing reliability through the elimination of additional lamp indicators which would otherwise require periodic replacement due to failure.

BRIEF DESCRIPTION OF THE INVENTION

The present invention is characterized by providing an LED array for visually displaying a number representative of the count of documents handled by the apparatus and for utilizing the same LED array, to the exclusion of any additional or independent lamp indicators, to display jam, batch and power-on conditions.

The electronic control means of the present invention is provided with jam sensing means for sensing the presence of a jam condition to cancel any count which may have been developed and displayed and flashing a decimal zero in the units position of the LED array. This same display is also utilized whenever the machine is first turned on.

The control means is provided with manually settable selector switch means for operating the paper handling and counting apparatus in either the normal count or "batching" modes. When in the normal counting mode, the LED array is normally blanked until the counting operation is either temporarily or permanently terminated, at which time a visual display of the count of documents is generated. The advantage of this arrangement resides in the fact that the count is changing at a rate which renders observation difficult and meaningless.

When setting the selector switch to the batch mode, upon initial switching any previous count being displayed by the LED array is cancelled and replaced by a flashing decimal zero in the units position. This operation is also accompanied by an abrupt halting of the drive motor for the paper handling and counting machine. Batching is now prevented from occurring until the operator depresses the "run" switch for the apparatus.

In the event that paper documents in the infeed hopper are exhausted before completion of a batch count, the partial count of the LED array is presented in a flashing manner. Upon the completion of a batch count of the selected batch quantity, the LED array displays the decimal number representative of the completed batch count in a "steady" fashion while abruptly halting the drive motor to enable the operator to remove the completed batch before beginning the next batch. A new batch is then initiated by depressing the "reset" switch. In the event that a jam occurs during the batching mode, the LED array is reset and is operated to display a flashing decimal zero in the units position. A "leading zero" blanking circuit blanks all unnecessary digit positions from being displayed.

Means are also provided for monitoring the current supplied to the motor so that when the current exceeds a predetermined threshold the monitoring means causes the generation of a jam condition, which jam condition may either be due to a jamming of paper documents or any foreign objects within the machine, as well as preventing an operator from being injured in the event that the operator's fingers or any article of clothing may become jammed in the machine.

The jam condition is abruptly initiated, typically within less than 1/10th of a second, to prevent the paper handling and counting machine from being damaged and to protect the operator from being injured or from having any article of clothing damaged.

OBJECTS AND BRIEF DESCRIPTION OF THE FIGURES

An object of the present invention is to provide electronic means for controlling paper handling and counting devices in which dynamic braking and monitoring of the machine drive is utilized in a novel manner so as to avoid the need for conventional electromagnetic clutches and brakes.

The above as well as other objects of the present invention will become apparent when reading the accompanying description and drawings in which:

FIG. 1*a* and 1*b* are schematic diagrams showing the electronic control means of the present invention.

DETAILED DESCRIPTION OF THE INVENTION

Before considering the electronic control means of the present invention it is useful to at least briefly understand the paper handling and counting means which the electronic circuitry of the present invention is designed to control.

A detailed description of one machine set forth in copending application Ser. No. 618,280 filed on Sept. 30, 1975 and assigned to the assignee of the present invention.

Figure 1A:
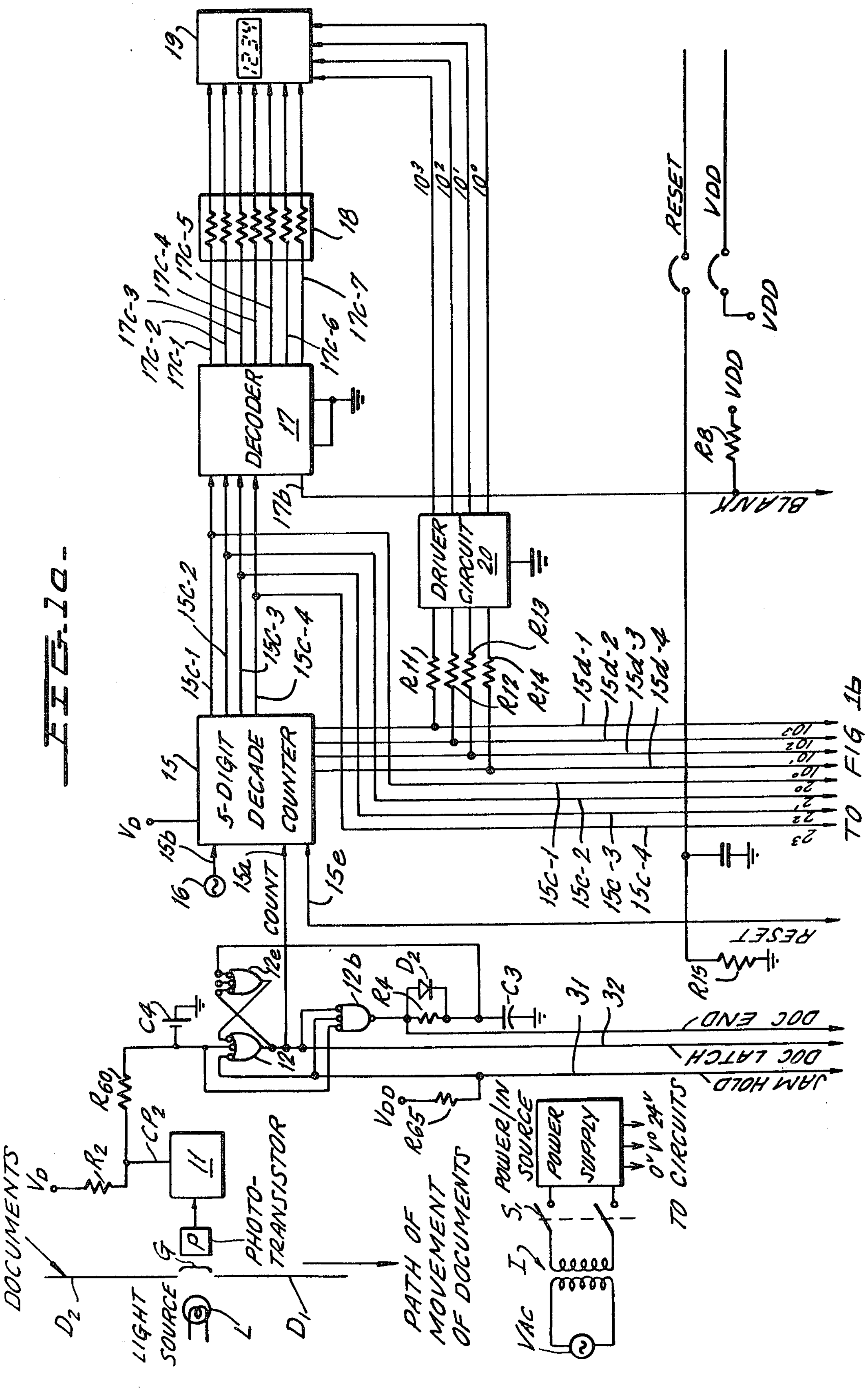
Figure 1B:
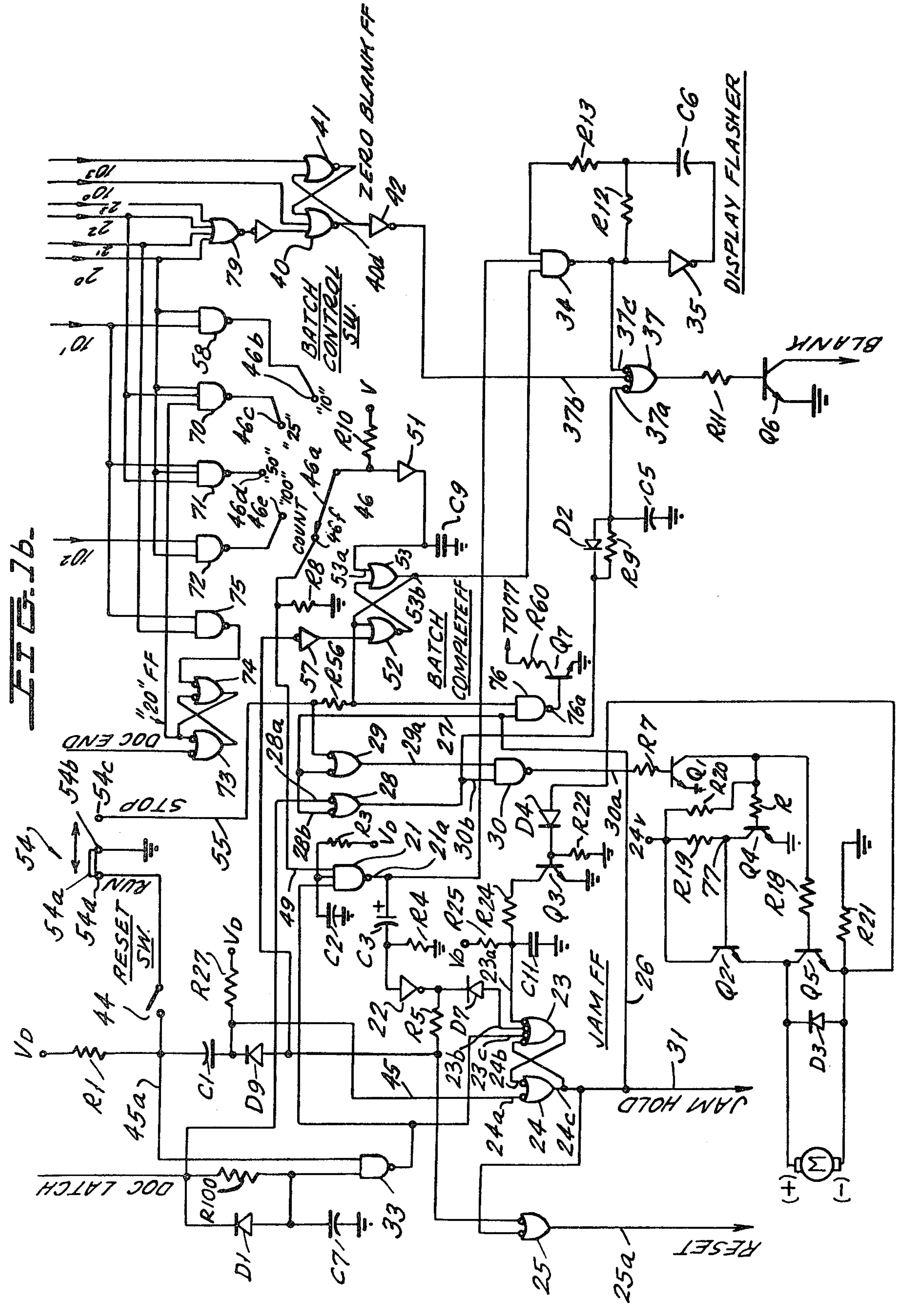

As shown in FIG. 1 thereof, paper documents such as paper sheets, currency, coupons, tickets, and the like, are arranged in a stack S which is placed in the infeed hopper section 12. The sheets are fed so that the bottom-most sheet enters into the machine 10 and the sheets are fed in seriatum wherein a small gap G between adjacent sheets is formed by means of the stripping assembly, O-rings and cooperating drive belts shown, for example, in FIG. 2*a*. A lamp source L and photodetector P (see also FIG. 1*a* herein) positioned adjacent the acceleration idler rollers serve to detect the gap between adjacent documents for counting purposes.

Returning to a consideration of FIG. 1 of the above-mentioned copending application, there is shown a control panel having a visual display which is preferably a segmented LED display capable of displaying any decimal number from 0000–9999. A power-on switch $S_1$ (see also FIG. 1*a* herein) is selectively operable to turn the unit on or off. The display may be reset by depressing the display reset button. The source Vac is coupled to recitifier/power supply unit $V_{DC}$ through switch $S_1$ and transformer T. The power supply $V_{DC}$ rectifies and filters the a.c. input and provides a ground reference ($0^V$), $24^V$ and low voltage ($V_D$) d.c. levels for operating the solid state circuits.

In the event that the machine stops, for example, during batching, and before a batch is completed, the partial count will be displayed in a flashing manner. If the machine stops during the normal count mode the total count is displayed in a "steady" fashion. If for any reason it is desired to stop the feeding and counting operation without turning off the machine, the lower portion of the run/stop button may be depressed to the stop position to stop the feeding and counting operation.

A selector switch is also provided for operating the unit in the count mode or any one of the four batching modes shown. In the count mode, the documents are simply placed in a stack S in the infeed hopper 12 and are counted. In the event that paper documents placed in the infeed hopper are exhausted, the count will remain displayed in a "steady" fashion and the machine will continue to run. As soon as an additional stack of documents is placed in the infeed hopper, paper handling and counting will resume without the need for operating any additional controls or switches.

In order to set the machine into the batching mode, the selector switch is moved to any one of the batching positions. Assuming that it is desired to form batches of 50 documents, the selector switch is positioned with its pointer adjacent the number "50". The stack of documents is then placed in the infeed hopper and counting begins. In the event that the stack of documents in the infeed hopper is exhausted before the batch is completed, the display will operate in a flashing manner to indicate the number of documents in the incomplete batch. However, the machine (i.e. the drive motor) will continue to run. The second stack of documents may then be placed in the infeed hopper. As soon as 50 documents are counted, the dynamic braking circuitry (to be more fully described hereinbelow) is activated to abruptly stop the feeding operation. At this time the display will display the decimal number "50" in a "steady" manner indicating that the stack S' of documents in the outfeed hopper is exactly 50 in number. The operator may then remove this batch of 50 documents, depress the reset switch and resume the batching operation.

As was mentioned hereinabove, documents are fed through the paper handling and counting machine whereby phototransistor P cooperates with light source L to sense the presence of a "gap" G between adjacent documents (see FIG. 1*a*). The sensing circuitry 11 shown in FIG. 1*a* connected to phototransistor P is utilized to provide an automatic compensating threshold circuit which adjusts for any change in the sensitivity level of the lamp source L and/or phototransistor P which may either be due to deterioration of the lamp source or phototransistor, accumulation of dust or dirt within the unit, and the like. This self-compensating circuit is disclosed in detail in the above-mentioned U.S. Pat. No. 3,870,868 and its circuitry is shown, for example, in FIG. 3 therein. For this reason, a detailed description of the circuitry will be omitted herein for purposes of simplicity.

The sensing signal developed by the self-compensating circuit is applied from the output of circuit 11 to the common terminal between resistor R2 and capacitor C4. This count pulse, designated CP2 is further conditioned by a hole rejection circuit substantially identical to that shown in FIG. 4*a* of the above-mentioned U.S. Pat. No. 3,870,868. The circuitry is comprised of the NOR gates 12 and 12*e* connected in a cross-coupled manner so as to form a flip-flop circuit, and further includes NAND gate 13, resistor R4, diode D2 and capacitor C3. The circuitry is described in detail in the above-mentioned U.S. Pat. No. 3,870,868 and operates in such a manner as to distinguish between a "gap" between adjacent documents passing the light source-phototransistor combination and punched holes, tears or other openings which may be present in the documents being counted, which tears or holes may be so positioned along the documents as to pass between the light source L and phototransistor P. Since this circuit is described in detail starting at line 18, column 11 through line 35, column 13 of U.S. Pat. No. 3,870,868, a detailed description of this circuit will be omitted herein for purposes of brevity, it being sufficient to understand that holes or tears within the body of a document, which holes or tears may pass between the light source and phototransistor, will not be erroneously interpreted as a "gap" between documents in order to prevent an erroneous count pulse from being generated.

The "conditioned" count signal is taken from the output of three-input NAND gate 12, as a positive going signal which is applied to the COUNT input 15*a* of multi-digit decade counter 15. The multi-digit decade counter 15 preferably contains at least four decade counters which are connected in cascade fashion and which are all time multiplexed sequentially in order to sequentially produce a binary coded decimal output at its four output leads 15*c*-1 through 15*c*-4 representative of the counts in each of the five counters. A suitable decade counter capable of accumulating decimal counts from 00000 through 99,999 and which may be utilized for this purpose is the Motorola Model MC4534 which is operated under control of a free-running oscillator 16 for operating the multiplexing unit preferably at a frequency of 15 kilohertz. The high frequency signal from free-running oscillator 16 causes each of the binary coded decimal counts, for each decimal digit position, to appear sequentially at the output leads 15*c*-1 through 15*c*-4.

The binary coded decimal count value for each decimal digit is applied to a binary coded decimal-to-seven-segment decoder 17 which is adapted to selectively drive associated segments of the LED seven-segment display 19. Current limiting to the three digit seven-segment display 19 is provided by the resistor network 18 which limits the current to each of the display segments to prevent damage thereto. The segment information is simultaneously applied to the seven segments of all display digit positions. However, only one of the display digit control inputs 15*d*-1 through 15*d*-4 coupled to each individual display digit position by way of the current driver circuit 20 are activated at any given time to select only one of the digit positions for illumination. Thus, the decade counter circuit 15 output lines 15*d*-1 through 15*d*-4 are coupled to respective ones of the inputs of driver circuitry 20, as well as being coupled to selected ones of the gates employed in the batch control circuitry of FIG. 1*b* as will be more fully described. The output lines 15*c*-1 through 15*c*-4 are also utilized by the batch decoder gates. The decade counter device 15, under control of the free-running oscillator 16, produces a binary coded decimal output for each one of the digit positions. The identity of the digit position whose binary coded decimal count appears in parallel at output lines 15*c*-1 through 15*c*-4 is indicated at that one of the lines 15*d*-1 through 15*d*-4 which is high. These signals are coupled through driver circuitry 20 to a second group of inputs 19*b* of the display 19 so that the binary coded decimal informaton converted into seven-segment signals by decoder 17 will be caused to illuminate the proper digit (i.e. units, tens or hundreds digit) of display 19. This results in a "scanned" display which scans at the frequency rate of oscillator 16. Due to the inherent "memory perception" of the eye, the display appears to the operator as a "steady" or continuously lit N digit decimal display where N = 4.

BATCH DETECT LOGIC

Power-on initialization is achieved by circuitry designed to artifically force a "jam" condition. When power is first turned on by closing switch $S_1$, a voltage $V_D$ is applied to one terminal of resistor R3 whose opposite terminal is connected in common to one terminal of capacitor C2 and to one input of gate 21 (see FIG. 1*b*). This input of gate 21 is initially held low on power-on by means of capacitor C2 whose charge time is controlled by the value of resistor R3 insuring a high level at the output 21*a* of gate 21. The output 21*a* of gate 21 is coupled through a differentiator capacitor C3 to hold the input to inverter 22 high for approximately one second (the charging time being determined by the values of resistor R4 and capacitor C3).

This high level pulse is inverted and the low level appearing at the output of inverter 22 is applied through diode D7 to one input 23*a* of NAND gate 23, which together with cross-coupled NAND gate 24, forms the jam flip-flop. The low level applied to input 23*a* sets the jam flip-flop causing the output 24*c* of gate 24 to assume a latched low level. This low level is applied to one input of NAND gate 25 whose output 25*a* resets the display to zero through reset line 25*a* which is coupled to the reset input 15*e* of circuit 15 of FIG. 1*a*.

Output 24*c* of the jam flip-flop is coupled through line 26 and line 27 to respective inputs of gates 28 and 29. The outputs of these gates are coupled to respective inputs of gate 30 whose output is coupled to the base of transistor Q1 through resistor R7. The collector of Q1 is coupled to the base electrodes of Q4 and Q5 through resistors R17 and R18, respectively. The drive motor M for the paper handling and counting device is connected across the collector and emitter electrodes of Q5 and motor M is de-energized when Q5 conducts and when Q2 is in cutoff. Thus when output 24*c* of the jam flip-flop is low, these low levels are applied to gates 28 and 29 driving the outputs of these gates high. The outputs of these gates being simultaneously high causes the output of gate 30 to go low to drive transistor Q1 into cutoff. Thus a high level is applied to the base electrodes of transistors Q4 and Q5 causing these transistors to conduct and causing Q2 to be driven into cutoff, maintaining motor M in the power-off state.

Output 24*c* of the jam flip-flop also is coupled through the Jam Hold line 31 to one input of NAND gate 12*b* which inhibits any spurious count pulses from being applied to the decade counter circuit 15. The output 12 of gate 12*a* generates the document latch signal in line 32 (FIG. 1*a*) which is applied through resistor R2 of FIG. 1*b* to one input of gate 33. Gate 33 sets Jam FF through input 23*c* and enables gate 21 to apply an output to gate 34 which activates the "flasher" oscillator comprised of resistors R12 and R13, inverter 35 and capacitor C6. The output of the flasher circuit is applied to one input of gate 37 whose output is coupled to the base of transistor Q6 through resistor R11. The collector of Q6 is coupled to the BLANK line 38 of FIG. 1*a* which serves to alternatively activate and deactivate the segment signals developed by decoder 17 at a rate which is slow enough to display a flashing zero to the operator.

The LED display activates a flashing zero in only the units position of the display due to the leading zero blanking flip-flop comprised of cross-coupled gates 40 and 41 (FIG. 1*b*) forming part of the batch detect logic circuitry. The Zero Blank flip-flop is set by the $10^3$ digit select line 15*d*-1 of FIG. 1*a* (the digit select sequence is in the high-to-low order) and is reset (to allow display) of any significant digit or by the $10^0$ line 15-1. Cross-coupled gates 40 and 41 are NOR gates such that any high inputs will force its output low. Thus the $10^3$ line 15*d*-1 sets the ZERO BLANK FF to drive output 40*d* high. The high level is inverted at 42 to apply a low level to input 37*b* of gate 37 causing the output to go high. The high level at the output **37*d* causes Q6 to conduct driving the input 17*b* of decoder 17 (FIG. 1*a*) to ground potential to blank the outputs 17*c*-1 through 17*c*-7 of decoder 17. The decoder remains blank until any non-zero decimal digit ($2^3$, $2^2$, $2^1$ or $2^0$, i.e. lines 13*c* through 15*c*-4) in any of the thousands, hundreds or tens positions is high to unblank decoder 17. The $10^0$ line 15*d*-4 rests the ZERO BLANK FF in the event that the thousands, hundreds, and tens digit positions are zero to illuminate at least the units position of the display to provide the "flashing zero" condition. Thus, the units digit position will be the only one illuminated when the power-on switch is activated. The output 40*d* of gate 40 is coupled through inverter 42 to one input of gate 37** so that the "zero" in the units digit position will be flashed by the display flasher circuitry and so that the other digit positions will be totally blank.

The reset switch 44 is comprised of a switch arm normally biased in the open position as shown in FIG. **1*b*. By momentarily depressing reset switch 44, a low level is applied from ground potential through switch 44 to the differentiating circuit capacitor C1 providing a momentary reset signal to the input 24*a* of jam flip-flop through line 45. The momentary closure of switch 44 also supplies a low level through line 45*a* to one input of gate 33 to hold off the jam condition. The reset pulse, in addition to resetting the jam flip-flop (comprised of gates 23 and 24) also applies a pulse through diode D9 to one input of gate 25 to reset the display to zero at any time the reset switch is actuated. The output of gate 25 is coupled through the reset line of FIG. 1*b* to the corresponding reset line of FIG. 1*a* to trigger reset input 15*e* of decade counter 15**. As will be more fully described, it should be understood that this reset switch is also utilized during times other than initial turn-on of th document handling and counting machine.

Actuation of the reset switch establishes conditions for energizing the drive motor. The resetting of the jam flip-flop causes both inputs of gate 28 and gate 29 to go high which forces their outputs low. These low outputs levels are applied to the inputs of gate 30 causing output **30*a* to go high. This high level turns on transistor Q1 so that its collector goes low. Thus, low input levels are applied to the base electrodes of transistors Q4 an Q5 turning these transistors off. The collector of Q4 thus goes high to turn on transistor Q2 thereby coupling the 24 volt supply through transistor Q2 to the (+) terminal of motor M while the (−) terminal of motor M is returned to ground through resistor R21**. The drive motor M is now energized and document handling and counting may begin.

Assuming that the batch control switch 46 is in the count position, the machine will continue to run until either a jam occurs, or the run/stop switch is moved to the stop position, or if power is turned off. The batch control switch 46 is comprised of a movable switch arm **46*a* and selectable stationary contacts 46*b*–46*f*, contact 46*f* constituting the COUNT position while contacts 46*b*–46*e*** constitute the various batch control positions (to be more fully described).

A jam condition is sensed by the delay network comprised of capacitor C7 and resistor R100, shown in the upper left-hand portion of FIG. **1*b*. Diode D1 acts as a recovery means which is utilized due to the fact that the high (document present) level is considerably greater in duration than the low ("gap") level. If the high level is sustained for approximately 200 milliseconds, the voltage appearing at the common terminal between C7 and R100 will be sufficiently high to cause one input of gate 33 to go high so that its output will go low in order to set the jam flip-flop input terminal 23*b* through diode D7 and thereby stop the drive motor, reset the count in counter unit 15** to zero and enable the display flasher. The machine will thus stop with a flashing zero, which condition serves as a visual jam indication.

If the machine is running in the COUNT mode and the batch control selector switch 46 is operated to move arm **46*a* from the count position (contact 46*f*) to any of the batch quantities (i.e. any of the contacts 46*b*–46*e*), the high level at voltage terminal V previously connected to gate 21 through resistor R10, switch arm 46*a*, contact 46*f* and line 49 to the input 21*b* of gate 21 is removed causing the level at input of gate 21 to go low as a result of being pulled to ground potential through resistor R8 which is coupled between line 49 and ground potential thereby causing output 21*b* of gate 21** to go high. The ensuing sequence is the same as the power-on initializing sequence described hereinbefore with the result that the machine will stop with a jam display indication (i.e. with a flashing zero condition). This prevents operator errors from occurring when first switching to a batching operation so as to prevent a previously counted group of documents in the outfeed stacker from having an additional "batch" of documents added to it; and to prevent documents in the infeed hopper which may not be intended for batching, to name just a few.

As shown in FIG. **1*b*** there are four selectable batch quantities, namely batch quantities of 10, 25, 50, and 100. Batching is accomplished by decoding the decade display counter.

The binary coded decimal bit combinations are combined with the appropriate digit select signal to develop each of the four required batch stop signals. The batch control switch selects the desired stop signal and applies this signal by way of inverter 51 to one input of the batch complete flip-flop comprised of cross-coupled gates 52 and 53.

As was previously described, batching may be initiated by moving the batch control switch arm to the desired batch quantity position and the run/stop switch 54 to the run position. Thereafter, with the run/stop switch 54 in the run position, the batch complete flip-flop is reset through reset switch 44 (which is momentarily depressed), diode D9, line 56 and inverter 57 coupled to reset input **52*a***.

Assuming that the batch control switch arm **46*a* is coupled to stationary contact 46*b* in order to form batches of ten documents, gate 58 serves as a means for developing the proper stop signal. One input of gate 58 is coupled to the $2^0$ line 15*c*-1 of decade counter 15 (see FIG. 1*a*) while the other input of gate 58 is coupled to the $10^1$ line 15*d*-4 shown in FIG. 1*a* so that when the tens position of the display is activated to develop a decimal 1, both of these levels will be high causing the output of gate 58 to go low thereby applying a low level through contact 46*b* and switch arm 46*a* to inverter 51. This state is reversed and applied to input 53*a* of gate 53 of the batch complete flip-flop. Gates 70–72 decode the batch counts "25", "50", and "100" respectively. Cross-coupled gates 73 and 74 and gate 75 cooperate with gate 70 to decode the "25" batch count. When a count of "20" occurs the $2^1$ line (15*c*-2) and the $10^1$ line (15*d*-3) are high causing the output of gate 75 to go low and set the "20" flip-flop (comprised of gates 73–74**). The output 74*a* goes high and is applied to one input of gate 70. The next time the $2^0$ line (15*c*-1) and the $2^2$ line (15*c*-3) go high the output of gate 70 goes low to set the BATCH COMPLETE flip-flop. Gate 71 decodes the "50" count when the $2^0$ line (15*c*-1), the $2^2$ line (15*c*-3) and the $10^1$ line (15*d*-3) are simultaneously high. Gate 72 decodes the "100" count when the $10^2$ line (15*d*-2) and the $2^0$ line (15*c*-1) are simultaneously high. Obviously other batch quantities may be incorporated by the addition of appropriate decoding gates, if desired.

The stop signal will occur on the leading edge of the last document of a batch. When the batch complete flip-flop sets, a low level appearing at output 53*a* is applied through resistor R56 to one input of gate 29 driving its output 29*a* high. This high level is applied to one input of gate 30. The presence of a document will hold input 28*a* of gate 28 high which, along with a high at its input 28*b* (which is the level occurring when no jam is present) holds the output of gate 28 and hence the input 30*b* of gate 30 low in order to keep the drive motor M energized.

When (in the example given) the 10th document in the batch completely passes the phototransistor sensing device P and lamp source L, input 28*a* to gate 28 goes low forcing the output of gate 28 high. This high level is applied to input 30*b* of gate 30 forcing its output low to turn off transistor Q1. The collector of Q1 goes positive to turn on Q4 and Q5 and to turn off Q2. With Q2 in the cutoff state, power is removed from the (+) terminal of motor M. The turn-on of Q5 provides a short-circuit path across the terminals of motor M which provides a path for the motor back-end induced current and thus brings the motor to an abrupt halt (dynamic braking is thus accomplished.

The batch complete flip-flop output appearing at terminal 53*b* of gate 53 goes low to disable the display flasher gate 34 when the batch is complete so that the segmented LED display 19 (FIG. 1*a*) will display the count "10" in what will appear to the eye of the operator as being a "steady" (i.e. non-flashing) display.

Incomplete batch quantities are indicated by flashing the partial or incomplete count. The display flasher gate 34 is maintained in the energized condition by the batch complete flip-flop (output 53*b*) and gate 21.

In addition thereto, a series of count pulses serves to develop a display blanking level by charging capacitor C5 through diode D2. The display is kept darkened during the counting process by means of a low level applied to input 37*a* of gate 37. After termination of count pulses (in the embodiment shown, approximately 250 milliseconds later) capacitor C5 is charged to a level sufficient to unblank the display enabling a "steady" display to be illuminated. The display is preferably "darkened" during counting since it is difficult to observe the display due to the fact that the number being displayed changes at the rate of more than 10 counts per second.

Resistor R21 serves as one element of a sensing circuit which is utilized to continuously monitor the load on motor M. R21 is coupled between the (−) terminal of motor M and ground potential. If the current through the motor and hence through resistor R21 exceeds a predetermined threshold (one typical example is 2 amperes), the voltage drop developed across resistor R21 rises to a value sufficient to turn on transistor Q3 through diode D4, coupled between the base electrode of Q3 and the positive terminal of resistor R21. If the high current persists for approximately 100 milliseconds (determined by the value of capacitor C11 and resistor R24) capacitor C11 discharges through resistor R24 and conducting transistor Q3 to reduce the level at the common terminal between capacitor C11 and resistor R25 to a magnitude sufficient to cause input 23*a* of gate 23 to go low thereby setting the Jam flip-flop and stopping the machine. This feature is provided as a means for detecting "front end" jams (i.e. document "wedging") and more importantly serves to protect operating personnel who may have a finger or a loose article of clothing drawn into the feed mechanism.

The run/stop switch 54 serves to stop the motor at any time and for any purpose. When moving the movable contact member 54*a* so as to span contacts 54*b* and 54*c*, the motor is turned off through gates 29 and 30 and transistor Q1. The run/stop switch 54 may then be returned to the position whereby movable conductive member 54*a* is coupled across contacts 54*b* and 54*d* to permit resumption of counting without reset. When stopped, the reset switch is disabled.

Gate 76 (FIG. 1*b*) has its inputs coupled to output 24*c* of the Jam flip-flop and to output 53*a* of the BATCH flip-flop. When either of these inputs go low output 76*a* goes high causing transistor Q7 to conduct. The collector of Q7 is coupled through resistor R60 to the common terminal 77 between R19, the collector of Q4 and the base of Q2. When Q7 conducts the current through transistor Q2 drops to approximately one-half the current drawn by Q2 when Q7 is in cutoff. This causes drive motor M to operate at one-half its normal rotating speed to reduce the operating speed of the paper handling and counting device to one-half normal operating speed as the last document of a batch is passing phototransistor P (FIG. 1*a*) thereby reducing the dynamic braking required when the last document of a batch passes sensor P.

It can be seen from the foregoing description that the novel solid state control means of the present invention serves the multiple functions of providing a visual display of a running count of documents, provides an indication of a jam condition, differentiates between a partial batch and a completed batch by flashing a partial batch count and by presenting a "steady" display of a completed batch and which further serves to provide a flashing zero during power-on initialization wherein all of said functions are performed by the visually observable LED display to the exclusion of any additional lamp indicators thereby simplifying the circuitry and further increasing reliability by the elimination of such additional independent lamp indicators which, in the case of being burned out or rendered defective, would fail to provide proper indications of machine status. Also, the elimination of such additional independent indicators further eliminates the need for periodic replacement. Operating life of the display is significantly increased by blanking the display during counting, by blanking unnecessary "leading zeros" and by operating the display in a "scanning" fashion.

The apparatus also includes means for abruptly stopping the drive motor for the document handling and counting device through a dynamic braking technique to eliminate the need for conventional electromagnetic clutches and brakes utilized, for example, in the apparatus of U.S. Pat. No. 3,771,783. The motor control circuitry further provides means for abruptly stopping the motor in the event of any jam condition or in the event of possible interference of the feeding mechanism by an operator to thereby prevent injury to the operator.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Electronic control means for a document handling and counting machine having: a drive motor;

means for sensing the load current on said drive motor to generate a signal having a magnitude representing the load current drawn by said drive motor;

braking means responsive to said sensing means for abruptly halting said drive motor when said sensing means signal reaches a predetermined threshold to protect the machine from being damaged and to protect the operator from being injured;

said braking means further comprising time delay means for halting the drive motor when the signal from said sensing means is at least equal to said threshold level for a predetermined time interval;

said sensing means comprising resistance means coupled in the motor supply circuit supplying current to the drive motor;

diode means coupled between said resistance means and the input of said time delay means whereby said diode means cooperates with said time delay means to establish the desired threshold level.

2. The control means of claim 1 wherein the delay circuit means further includes transistor means having a base coupled to said diode means such that the base-emitter voltage drop of the transistor cooperates with said diode means to establish the desired threshold.

3. The control means of claim 2 wherein said transistor is an NPN transistor.

4. The device of claim 1 further comprising first solid state switch means being normally conductive to supply power to said drive motor;

second solid state switch means being coupled across the inputs of the drive motor;

said means for halting said motor including means for turning off said first solid state switch means and for turning on said second solid state switch means to decouple power from the drive motor and place a short circuit across the drive motor input terminals thereby abruptly halting the drive motor by dynamic braking.

5. The device of claim 1 further comprising a voltage source and first and second transistor means each comprising collector base and emitter electrodes;

the motor being connected across the collector and emitter electrodes of said first transistor means;

the collector and emitter electrodes of said second transistor means being connected between said voltage source and one terminal of said motor;

said sensing means comprising resistance means being connected between the remaining terminal of said motor and reference potential;

time delay circuit means;

threshold means responsive to the presence of a predetermined voltage drop across said resistor means for activating said time delay means;

means responsive to time-out of said time delay means for rendering said first and second transistor means respectively conductive and non-conductive to thereby simultaneously decouple power source from said motor and to short circuit said motor to cause dynamic braking of said motor means;

said means including additional transistor means for normally maintaining said first and second transistor means respectively non-conductive and conductive so long as said time delay means is not timed out.

6. The device of claim 5 further comprising diode means coupled across the terminals of said motor and being connected in such polarity as to provide for further dynamic braking of the motor.

7. Electronic control means for a document handling and counting machine having a drive motor;

means for sensing the passage of documents as they pass a predetermined location;

means for sensing the load current on said drive motor to generate a signal having a magnitude representing the load current drawn by said drive motor;

time delay means for generating a signal when the signal from said sensing means is at least equal to a predetermined threshold level for a predetermined time interval;

means responsive to the signal from said delay circuit means for initially reducing the current supply to said drive motor to substantially reduce the drive motor operating speed;

means responsive to said time delay means and to the passage of the next document by the document sensing means for generating a braking control signal;

braking means responsive to the braking control signal for abruptly halting said drive motor to protect the machine from being damaged and to protect the operator from being injured while at the same time allowing the last counted document to be passed through the machine.

* * * * *

UNITED STATES PATENT AND TRADEMARK OFFICE

CERTIFICATE OF CORRECTION

PATENT NO. : 4,099,214

DATED : July 4, 1978

INVENTOR(S) : Alan P. Jones

It is certified that error appears in the above-identified patent and that said Letters Patent are hereby corrected as shown below:

Column 4, Line 54 "13" should read --12--

Column 5, Line 17 the word "MC4534" should read --MC14534--

Column 6, Line 43 the word "12" should be omitted

Column 6, Line 43 the word "12a" should read --12--

Column 9, Line 34 after the word "accomplished." insert --)--

Signed and Sealed this

***Eighth* Day of *May 1979***

[SEAL]

*Attest:*

RUTH C. MASON
*Attesting Officer*

DONALD W. BANNER
*Commissioner of Patents and Trademarks*